United States Patent
Karimine et al.

(10) Patent No.: US 10,544,479 B2
(45) Date of Patent: *Jan. 28, 2020

(54) HEAT TREATMENT DEVICE, HEAT TREATMENT METHOD, AND RAIL STEEL

(71) Applicant: NIPPON STEEL CORPORATION, Tokyo (JP)

(72) Inventors: Kenichi Karimine, Kitakyushu (JP); Masaharu Ueda, Kitakyushu (JP); Kenji Saita, Kitakyushu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 455 days.

This patent is subject to a terminal disclaimer.

(21) Appl. No.: 15/123,485

(22) PCT Filed: Apr. 6, 2015

(86) PCT No.: PCT/JP2015/060713
§ 371 (c)(1),
(2) Date: Sep. 2, 2016

(87) PCT Pub. No.: WO2015/156243
PCT Pub. Date: Oct. 15, 2015

(65) Prior Publication Data
US 2017/0073793 A1    Mar. 16, 2017

(30) Foreign Application Priority Data

Apr. 8, 2014 (JP) .................. 2014-079489
Apr. 8, 2014 (JP) .................. 2014-079503

(51) Int. Cl.
*C21D 9/50* (2006.01)
*C21D 9/04* (2006.01)
*C21D 1/42* (2006.01)

(52) U.S. Cl.
CPC ............ *C21D 9/50* (2013.01); *C21D 1/42* (2013.01); *C21D 9/04* (2013.01)

(58) Field of Classification Search
CPC ....................... C21D 9/50; C21D 9/04
See application file for complete search history.

(56) References Cited

U.S. PATENT DOCUMENTS

| 4,573,666 A | 3/1986 | Nomura et al. |
| 2012/0015212 A1 | 1/2012 | Karimine et al. |

(Continued)

FOREIGN PATENT DOCUMENTS

| CA | 981066 A | 1/1976 |
| CA | 2756855 A1 | 10/2010 |

(Continued)

OTHER PUBLICATIONS

Russian Office Action and Search Report dated Dec. 13, 2017 for corresponding Russian Application No. 2016138533, with English translations.

(Continued)

*Primary Examiner* — Scott R Kastler
(74) *Attorney, Agent, or Firm* — Birch, Stewart, Kolasch & Birch, LLP

(57) ABSTRACT

An object of the present invention is to provide a heat treatment device, a heat treatment method, and a rail steel which are suitable for preventing the occurrence of brittle fractures which originate in a base portion of a weld of the rail steel. A heat treatment device of the present invention includes a coil and heats a bottom surface of the base portion of the weld of the rail steel by induction heating. When a region in the weld which is heated to an Ac1 point or higher during welding is represented by HAZ, and the length of the HAZ in a length direction of the rail on the bottom surface of the base portion is represented by Lh, and a width of the (Continued)

rail steel is represented by W, the length of an outer region of the coil in the length direction of the rail is 1.2 times or more Lh and the length of the outer region of the coil in a width direction of the rail is 1.1 times or more W when viewed from opposite the bottom surface of the base portion.

16 Claims, 9 Drawing Sheets

(56) References Cited

U.S. PATENT DOCUMENTS

| | | | |
|---|---|---|---|
| 2012/0234806 A1 | 9/2012 | Saita et al. | |
| 2014/0087320 A1 | 3/2014 | Karimine et al. | |
| 2015/0211087 A1* | 7/2015 | Karimine | B23K 31/00 266/249 |
| 2017/0073793 A1* | 3/2017 | Karimine | C21D 9/04 |

FOREIGN PATENT DOCUMENTS

| | | |
|---|---|---|
| GB | 273326 A | 5/1928 |
| GB | 2403174 A | 12/2004 |
| JP | 48-95337 | 12/1973 |
| JP | 56-136292 A | 10/1981 |
| JP | 58-153731 A | 9/1983 |
| JP | 59-93837 A | 5/1984 |
| JP | 59-93838 A | 5/1984 |
| JP | 61-67719 A | 4/1986 |
| JP | 63-45321 A | 2/1988 |
| JP | 63-160799 A | 7/1988 |
| JP | 3-249127 A | 11/1991 |
| JP | 3-277720 A | 12/1991 |
| JP | 8-337819 A | 12/1996 |
| JP | 11-58042 A | 3/1999 |
| JP | 11-270810 A | 10/1999 |
| JP | 2001-105158 A | 4/2001 |
| JP | 2006-57128 A | 3/2006 |
| JP | 2010-543 A | 1/2010 |
| JP | 2012-30242 A | 2/2012 |
| RU | 2411295 C2 | 2/2011 |
| SU | 1735392 A1 | 5/1992 |
| WO | WO 2010/116680 A1 | 10/2010 |
| WO | WO 2011/052562 A1 | 5/2011 |
| WO | WO 2012/161207 A1 | 11/2012 |

OTHER PUBLICATIONS

International Search Report for PCT/JP2015/060713 dated Jun. 30, 2015.
Written Opinion of the International Searching Authority for PCT/JP2015/060713 (PCT/ISA/237) dated Jun. 30, 2015.
Australian Examination Report dated May 21, 2014 issued in Australian patent application No. 2012259857.
Australian Office Action dated Nov. 19, 2014, issued in Australian Patent Application No. 2012259857.
Australian Office Action dated Sep. 19, 2014, issued in Australian Patent Application No. 2012259857.
Canadian Office Action dated Jan. 12, 2015, issued in Canadian Patent Application No. 2,836,260.
Carpenter et al., "Residual Stresses in Welded Rails," Proceedings Railroad Rail Welding; AAR, Memphis, USA, Nov. 29-30, 1983, pp. 153-160 (13 pages total).
Urashima et al., "The Influence of Residual Stress on Durability of Rails," Proceedings of the Second International Conference on Residual Stresses, ICR2, Nancy, France, Nov. 23-25, 1988, pp. 912-918.
Written Opinion of the International Search Authority and International Search Report (forms PCT/ISA/237 and PCT/ISA/210), dated Aug. 21, 2012 for corresponding International Application No. PCT/JP2012/063147, with English translations.
Brazilian Gazette dated Jul. 10, 2018 providing Brazilian Office Action and Search Report for corresponding Brazilian Application No. 112013029859-6, dated Jun. 8, 2018, with an English translation.
Ichiyama et al., "Flash-Butt Welding of High Strength Steels," Nippon Steel Technical Report, No. 95, Jan. 2007, pp. 81-87.
U.S. Notice of Allowance, dated Jul. 30, 2018, for U.S. Appl. No. 14/119,819.
U.S. Office Action, dated Mar. 11, 2016, for U.S. Appl. No. 14/119,819.
U.S. Office Action, dated Mar. 13, 2018, for U.S. Appl. No. 14/119,819.
U.S. Office Action, dated Oct. 4, 2016, for U.S. Appl. No. 14/119,819.
U.S. Office Action, dated Sep. 5, 2017, for U.S. Appl. No. 14/119,819.
U.S.Corrected Notice of Allowability, dated Sep. 10, 2018, for U.S. Appl. No. 14/119,819.

* cited by examiner

HEAT TREATMENT DEVICE, HEAT TREATMENT METHOD, AND RAIL STEEL

TECHNICAL FIELD OF THE INVENTION

The present invention relates to a heat treatment device, a heat treatment method, and a rail steel.

Priorities are claimed on Japanese Patent Application No. 2014-79489, filed on Apr. 8, 2014, and Japanese Patent Application No. 2014-79503, filed on Apr. 8, 2014, the contents of which are incorporated herein by reference.

RELATED ART

During use of a rail steel, rail fractures may occur in a weld of the rail steel. Rail fractures occur due to load, vibrations, or the like generated when a train passes over a rail. As one of fracture morphologies of a rail, there are brittle fractures due to cracks generated in the weld. Brittle fractures include fractures which originate in a rail web portion or a rail base portion, and it is necessary to prevent all of these fractures.

In addition, in the present specification, a region which is heated to an Ac1 point or higher during welding is referred to as a HAZ (Heat Affected Zone). In a case where weld beads exist, the weld beads are heated to the Ac1 point or higher, and the weld beads are included in the HAZ.

In Patent Document 1 and Patent Document 2, as inventions with respect to heat treatment for preventing factures of a weld, a technology is disclosed, which rapidly cools the entire HAZ or a rail head portion and a rail web portion (abdominal portion) of the HAZ of which a temperature is 400° C. or higher. In Patent Document 1 and Patent Document 2, a method for heating the entire HAZ or the rail head portion and the rail web portion (abdominal portion) of the HAZ to 400° C. or higher may include any one of using self-retention heat, flame heating, high frequency induction heating, or the like.

Meanwhile, in Patent Document 3, as a method for preventing fractures which originate in a base portion in rail base metal rather than a weld, a method of reheating a center portion in a width direction of a bottom surface of the base portion in the rail base metal to 500° C. to 600° C. has been disclosed. By using the reheating method disclosed in Patent Document 3, it is possible to apply compressive residual stress to the bottom surface of the rail base portion and to prevent fractures of the rail generated due to damage or the like. In Patent Document 3, as reheating methods, there are gas flame heating and high frequency heating (induction heating).

PRIOR ART DOCUMENT

Patent Document

[Patent Document 1] Japanese Unexamined Patent Application, First Publication No. S59-093837

[Patent Document 2] Japanese Unexamined Patent Application, First Publication No. S59-093838

[Patent Document 3] Japanese Unexamined Patent Application, First Publication No. 2006-057128

DISCLOSURE OF THE INVENTION

Problems to be Solved by the Invention

The methods disclosed in Patent Document 1 and Patent Document 2 are somewhat effective for preventing brittle fractures which originate in the rail web portion of the HAZ. However, it is difficult to prevent brittle fractures which originate in the rail base portion of the HAZ.

As a method which prevents fractures which originate in the base portion in the rail base metal rather than the weld (HAZ), the method of reheating the center portion in the width direction of the bottom surface of the base portion in the rail base metal to 500° C. to 600° C. has been disclosed (Patent Document 3). Due to the reheating, it is possible to apply compressive residual stress to the bottom surface of the rail base portion and to prevent fractures generated due to damage or the like. However, according to this method, fractures in the weld are not prevented, and conversely, in a case where a reheating temperature of a bottom portion of the rail exceeds 600° C., the hardness of the rail steel rapidly decreases, fracture stress decreases when the rail is damaged, and damage may occur at the bottom portion of the rail (refer to Paragraph [0014] or the like of Patent Document 3).

In addition, none of patent documents discloses a specific shape of a coil for performing induction heating on the weld.

The present invention is made in consideration of the above-described circumstances, and an object of the present invention is to provide a heat treatment device, a heat treatment method, and a rail steel which are suitable for preventing occurrence of brittle fractures which originate in a base portion of a weld of the rail steel.

Means for Solving the Problem

Present inventors found that, in brittle fractures which originate in a rail base portion of a HAZ, a center portion in a length direction of the rail of the HAZ had the highest frequency in occurrence of cracks, and the vicinity of a boundary (the vicinity including base metal at a position at which a heating temperature during welding becomes an Ac1 point) between the HAZ and the rail base metal had the next highest frequency in occurrence of cracks. The present inventors found that the origins of the occurrence of the cracks were the hardest portion (center portion in the length direction) in the HAZ and a portion in which the hardness (Hv value) in the length direction of the rail (including the HAZ) changed rapidly (refer to Example 6 and FIG. 8).

The present inventors conceived that it was possible to prevent the occurrence of cracks by decreasing a rapid change of hardness or performing heat treatment (softening treatment) in order to decrease the hardness in the vicinity of the boundary between the HAZ and the rail base metal in order to prevent brittle fractures which originated in the rail base portion of the HAZ. In addition, the inventors conceived that it was possible to prevent the occurrence of cracks which were origins of brittle fractures or prevent propagation of cracks even if the cracks occurred due to heating only a surface layer at a heating temperature higher than 600° C. to 800° C. in heat treatment to soften the surface layer, and cracks may occur in the rail base portion in a case where softening treatment was performed on the rail head portion, and the inventors completed the present invention.

The present invention adopts the following means so as to solve the above-described problems and achieve the related object.

(1) According to an aspect of the present invention, there is provided a heat treatment device which includes a coil and heats a bottom surface of a base portion of a weld of a rail steel by induction heating, in which when a region in the weld which is heated to an Ac1 point or higher during welding is represented by HAZ, and a length of the HAZ in a length direction of the rail on the bottom surface of the base portion is represented by Lh, and a width of the rail steel is represented by W, a length of an outer region of the coil in the length direction of the rail is 1.2 times or more Lh and a length of the outer region of the coil in a width direction of the rail is 1.1 times or more W when viewed from opposite the bottom surface of the base portion.

(2) In the heat treatment device according to (1), the length of the outer region of the coil in the length direction of the rail may be 40 mm or more.

(3) In the heat treatment device according to (1) or (2), the length of the outer region of the coil in the width direction of the rail may be 1.2 times or more W.

(4) In the heat treatment device according to any one of (1) to (3), a shape of the outer region of the coil may be rectangular.

(5) According to another aspect of the present invention, there is provided a heat treatment method of a weld of a rail steel, including: disposing the coil of the heat treatment device according to any one of (1) to (4) so as to face the bottom surface of the base portion, heating a region which is interposed between a pair of virtual lines, which is positioned symmetrically with respect to a welding center when viewed from opposite the bottom surface of the base portion such that a distance between the pair of virtual lines is 1.2 times Lh, at a heating velocity of 3° C./s or faster and 20° C./s or slower, and heating at least a position C, which is positioned on the welding center of the bottom surface of the base portion and on the center of the rail steel in the width direction, to higher than 600° C. to 800° C.; and cooling the rail steel after the heating.

(6) In the heat treatment method according to (5), in the heating, the position C may be heated to a temperature which is higher than 600° C. and the Ac1 point or lower.

(7) In the heat treatment method according to (5), in the heating, the position G may be heated to a temperature which is higher than the Ac1 point to 800° C., and the cooling may be performed by air cooling.

(8) In the heat treatment method according to any one of (5) to (7), in the heating, a heating temperature of a head portion of the rail steel may be set to 600° C. or lower.

(9) According to a still another aspect of the present invention, there is provided a rail steel which includes a weld, in which a heat treatment is performed on the weld using the heat treatment method of a weld of a rail steel according to any one of (5) to (8).

Effects of the Invention

According to the above aspects, it is possible to provide a heat treatment device, a heat treatment method, and a rail steel which are suitable for preventing the occurrence of brittle fractures which originate in a base portion of a weld of the rail steel.

EMBODIMENTS OF THE INVENTION

Subsequently, specific embodiments will be described with reference to the drawings below.

Figure 2A:
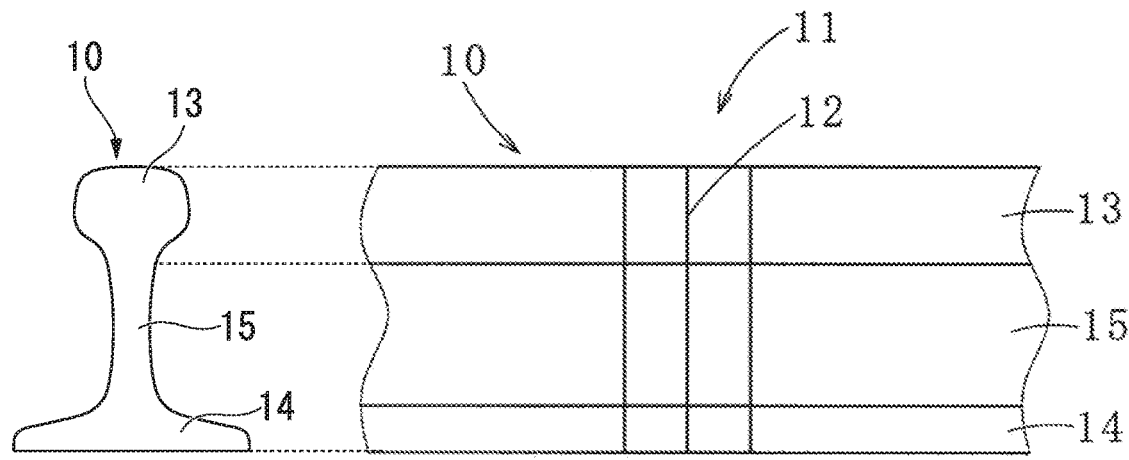
FIG. 2A is a sectional view and a partial side view for explanation of a name of each portion of the rail steel.
Figure 2B:
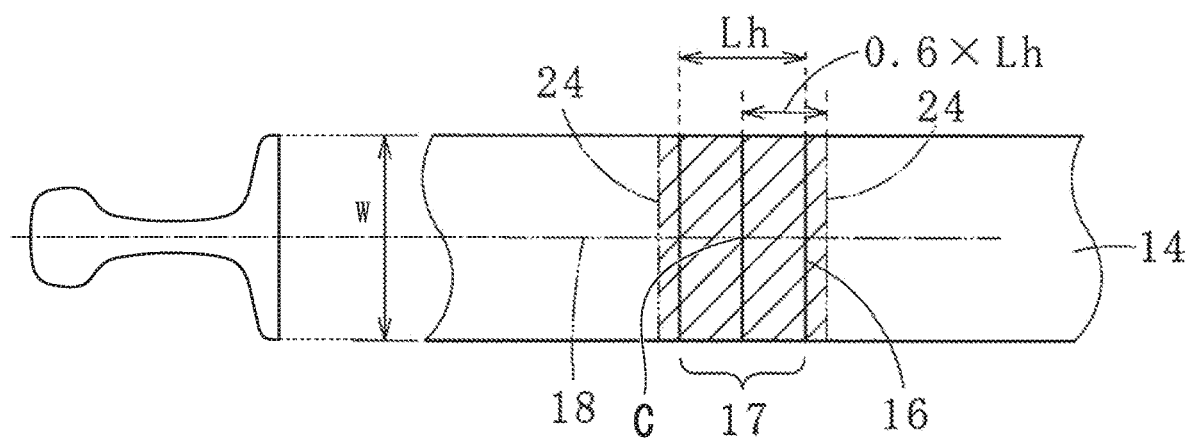
FIG. 2B is a sectional view and a partial bottom view for explanation of the name of each portion of the rail steel.

First, a welded rail steel 10 (hereinafter, simply referred to as a "rail 10") is described with reference to FIGS. 2A and 2B. FIG. 2A is a sectional view and a partial side view perpendicular to a length direction of the rail 10, and FIG. 2B is a sectional view and a partial bottom view perpendicular to the length direction of the rail 10.

In the rail 10, end surfaces of rails which are at least two materials to be welded are welded to each other, and the rail 10 includes a weld 11. The weld 11 includes a welding center 12 which is a portion at which the end surfaces of the rails to be welded before welding come into contact with each other. Moreover, the rail 10 includes a rail head portion (head portion 13) which is positioned on the upper portion and comes into contact with a wheel, a rail base portion (base portion 14) which is positioned on the lower portion and comes into contact with a sleeper, and a rail web portion (web portion 15) which is perpendicularly provided between the head portion 13 and the base portion 14 and connects the head portion 13 and the base portion 14. Steel which forms the rail steel 10 is not particularly limited. However, a hypo-eutectoid steel, a eutectoid steel and a hyper-eutectoid steel, or the like having a carbon content of approximately 0.6 mass % to 1.0 mass % may be used.

In the weld 11, a region which is heated to an Ac1 point or higher during welding is defined as a HAZ 17, a length of the HAZ 17 in a length direction of the rail at a center position 18 in a width direction of the rail 10 on a bottom surface of the base portion 14 is defined as Lh, and a width of the rail 10 is defined as W.

The Ac1 point indicates a temperature at which transformation of a metallographic structure starts in the vicinity of 720° C. to 750° C. in a process in which steel is heated from a temperature region of 700° C. or lower. The Ac1 point is a temperature at which transformation from cementite to austenite starts in a hypo-eutectoid steel, transformation from ferrite to austenite starts in a hyper-eutectoid steel, and transformation from ferrite to austenite and transformation from cementite to austenite in a eutectoid steel simultaneously start.

The Ac1 points are different from each other according to carbon contents and alloy components of the steel. The Ac1 point can be correctly obtained by observing microstructures on the cross section of the weld 11. That is, as a method for correctly obtaining the Ac1 point, there is a method which observes metallographic structures of a cross section, which is positioned at the center of the weld in the width direction of the rail and parallel with the longitudinal direction of the rail, from a base metal side on which the highest arrival temperature during welding is low toward the center of welding using a microscope, and obtains a position at which spheroidized structures of pearlite are changed to structures in which pearlitic structures and the spheroidized structures of pearlite are mixed. In order to easily obtain the Ac1 point, it is possible to read the Ac1 point from a Fe—$Fe_3C$ equilibrium diagram described in a textbook (for example, Steel Material issued by Japanese Metallurgical Society) of metallurgy or the like, on the basis of the carbon content. The Ac1 point of an actual rail steel 10 is higher by 5° C. to 30° C. than a line of the equilibrium diagram. The Ac1 point of the rail steel 10 having general compositions is 725° C. to 750° C.

In the HAZ 17, it is possible to obviously observe the region which is heated to the Ac1 point or higher and in which microstructural changes are generated by observing the macrostructures on the cross section of the weld 11. As a method which observes microstructures and macrostructures on the cross section of the weld 11, there is a method for etching the cross section using a nital or dilute hydrochloric acid. The size of the HAZ 17 is determined by heat input during welding, and the sizes of the HAZ 17 are the same as each other if welding conditions are the same as each other.

Lh can be confirmed by observing the macrostructures on the cross section in the length direction of the rail which passes through the center position 18 in the width direction of the rail 10. The welding center 12 is a surface which is perpendicular to the length direction of the rail and is parallel to the width direction of the rail through the center of the HAZ 17.

(Heat Treatment Device)

Next, a heat treatment device will be described.

Figure 1A:
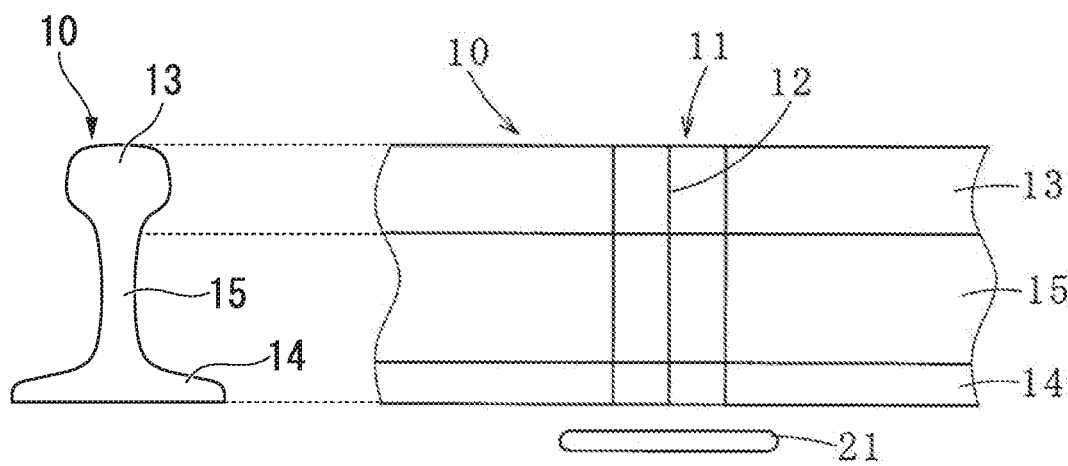
FIG. 1A is a sectional view and a partial side view showing a heat treatment device and a rail steel according to a first embodiment of the present invention.
Figure 1B:
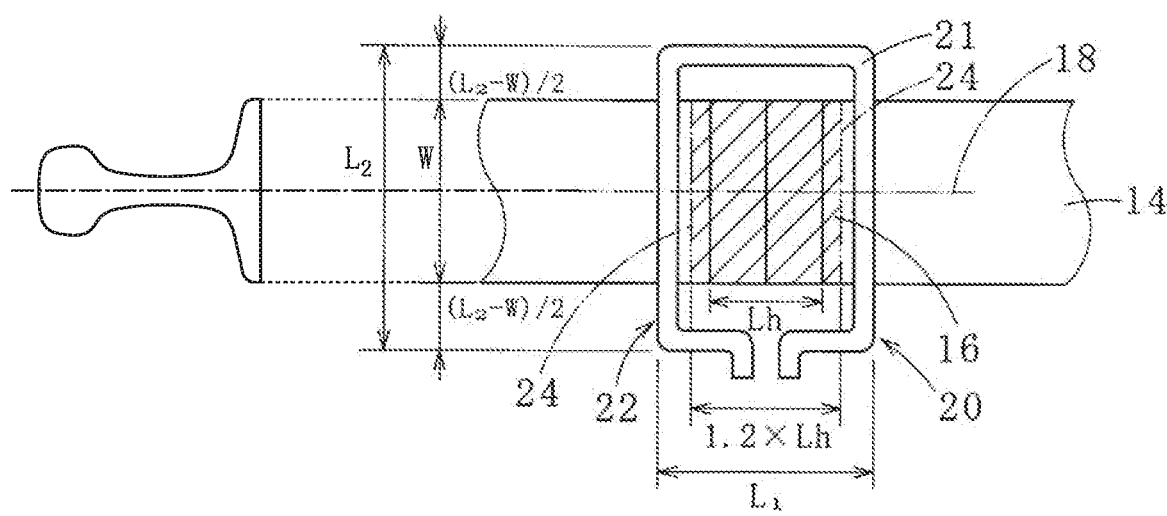
FIG. 1B is a sectional view and a partial bottom view showing the heat treatment device and the rail steel according to the first embodiment of the present invention.

As shown in FIGS. 1A and 1B, a heat treatment device 20 according to a first embodiment of the present invention includes a coil 21. The heat treatment device 20 heats a bottom surface of the base portion 14 of the weld 11 of the rail 10 by induction heating.

The coil 21 is a coil which has a rectangular shape and is wound once when viewed from a direction of an axis (a center axis of an outer region 22 in the length direction of the rail in a case where the coil 21 is installed on the bottom surface of the base portion 14) 23 (state of FIG. 1B). That is, the shape of the outer region 22 of the coil 21 is rectangular. The direction of the axis 23 is a direction when viewed in a line of sight against the bottom surface of the base portion 14, and is a direction of a magnetic field which is generated in the coil 21 when electricity flows to the coil 21.

A length $L_1$ in a lateral direction (the length direction of the rail of the outer region 22 in the case where the coil 21 is installed on the bottom surface of the base portion 14) of the outer region 22 of the coil 21 when viewed from the direction of the axis 23 is 1.2 times or more Lh. Since the length $L_1$ in the lateral direction is 1.2 times Lh, as described below, it is possible to effectively heat a region outside the HAZ 17, in which hardness changes rapidly, so as to be softened, and it is possible to prevent occurrence of brittle fractures. The upper limit of the length $L_1$ in the lateral direction is not particularly limited. However, for example, the upper limit may be 3 times or more Lh. In a case where $L_1$ exceeds 3 times Lh, effects for preventing occurrence of the brittle fractures are maximized. In addition, if the length $L_1$ in the lateral direction is excessively long, that is, if the softened region is excessively spread in the length direction of the rail, bending increases during use, and cracks are likely to occur.

Considering that Lh of the rail 10 used in general welding conditions is approximately 33 mm or more, the length $L_1$ in the lateral direction of the outer region 22 in a case where the coil 21 is viewed from the direction of the axis 23 is 40 mm or more, and is preferably 45 mm or more. In a case where the length $L_1$ in the lateral direction is less than 40 mm, it is not possible to effectively perform heat treatment on the weld 11 having a wide HAZ in a general rail 10.

For the Lh of the general rail 10, for example, the specific upper limit of the length $L_1$ in the lateral direction is 200 mm.

When viewed from the direction of the axis 23, a length $L_2$ in a longitudinal direction (the width direction of the rail of the outer region 22 when the coil 21 is installed on the bottom surface of the base portion 14) of the outer region 22 of the coil 21 is 1.1 times or more the width W. That is, when viewed from the direction of the axis 23, the outer edge in the width direction of the rail 10 is separated from the outside (outer edge) of the coil 21 by a distance which is 0.05 times or more the width W.

Since the $L_2$ in the longitudinal direction is 1.1 times or more the width W, it is possible to decrease the difference of temperature rise in the width direction of the rail 10.

Preferably, the length $L_2$ in the longitudinal direction is 1.2 times or more the width W. In this case, when viewed from the direction of the axis 23, the outer edge in the width direction of the rail 10 is separated from the outside (outer edge) of the coil 21 by a distance which is 0.1 times or more the width W. Since the length $L_2$ in the longitudinal direction is 1.2 times or more the width W, it is possible to further decrease the difference of temperature rise in the width direction of the rail 10.

The upper limit of the length $L_2$ in the longitudinal direction is not particularly limited. However, for example, the upper limit of the length $L_2$ in the longitudinal direction may be 3 times the width W. In a case where the length $L_2$ in the longitudinal direction exceeds 3 times the width W, effects for decreasing the difference of temperature rise in the width direction of the rail 10 are maximized In addition, the width W of the general rail 10 including a light rail is approximately 50 mm to 150 mm, and in the case of a railway rail for a commercial railroad, the width W is approximately 100 mm to 150 mm.

For example, as the coil 21, a copper coil may be used, and a pipe-shaped coil such as a copper pipe may be used. In the case of the pipe-shaped coil, since cooling water can flow into the inner portion of the coil, it is possible to prevent the temperature rise in the coil itself or other portions. A sectional shape of a metal wire and a metal pipe which forms the coil 21 includes a circular shape, an elliptical shape, an approximately square shape, or the like, and is not particularly limited. Outer diameters and lengths of long sides of the metal wire and the metal pipe are not particularly limited. However, preferably, the outer diameters and the lengths are approximately 5 mm to 40 mm.

The heat treatment device 20 includes a high frequency power source (not shown) which is electrically connected to the coil 21. The high frequency power source is not particularly limited as long as it is a power source which generates a high frequency current having a predetermined frequency, and a well-known high frequency power source such as a transistor type high-frequency power source, a thyristor type high-frequency power source, or an electron tube type high-frequency power source may be used. In addition, the heat treatment device 20 may include a fixing unit of the coil 21 or a temperature measurement unit (for example, a thermocouple, a radiation-type thermometer, or the like) of a heated portion.

(Heat Treatment Method)

A heat treatment method of the weld of the rail steel according to a second embodiment of the present invention includes a step (A) of heating a predetermined region in the weld 11 using the heat treatment device 20 by induction heating, and a step (B) of cooling the weld 11 after the heating.

Step (A)

The induction heating is performed in a state where the heat treatment 20 is disposed so as to be close to the bottom surface side of the base portion 14. Specifically, as shown in FIGS. 1A and 1B, the axis 23 of the coil 21 and the bottom surface of the base portion 14 are perpendicular to each other, and when viewed from the direction of the axis 23, the coil 21 of the heat treatment device 20 is disposed so as to face the bottom surface of the base portion 14 such that the outer region 22 includes a region 16 interposed between a pair of virtual lines 24. Each of the pair of virtual lines 24 is a straight line parallel to the welding center 12, the pair of the virtual lines 24 is disposed so as to be symmetrical from the welding center 12, and a distance between the pair of the virtual lines 24 is 1.2 times Lh. When viewed from the direction of the axis 23, that is, when viewed from opposite the bottom surface of the base portion 14 (the state of FIG. 1B), the outer region 22 becomes the heating region on the bottom surface of the base portion 14 of the rail 10.

The coil 21 is disposed such that the center in the lateral direction ($L_1$ direction) of the outer region 22 of the coil 21 coincides with the welding center 12 and the center of the outer region 22 in the longitudinal direction ($L_2$ direction) coincides with the center position 18 in the width direction of the rail.

In addition, the distance between the coil 21 and the bottom surface of the base portion 14 is not particularly limited if it is a distance within which the coil 21 can heat the bottom surface of the base portion 14 by induction heating. For example, this distance may be approximately 5 mm to 50 mm.

In the induction heating, the heat treatment device 20 is disposed as described above, and the bottom surface of the base portion 14 is heated at a heating velocity of 3° C./s to 20° C./s, and preferably, at a heating velocity of 5° C./s or more.

Since the bottom surface of the base portion 14 of the rail steel 10 is rapidly heated (the heating velocity is set to 3° C./s or faster and 20° C./s or slower), only a surface layer of the rail steel 10 is softened, and a hard layer can be left in the inner portion of the rail steel 10. Accordingly, it is possible to prevent the occurrence and progression of cracks in the rail steel 10.

In a case where the heating velocity is slower than 3° C./s, since the portion of the rail steel 10 from the surface of the rail steel 10 to a deep portion thereof is heated and softened, the strength of the base portion 14 significantly decreases. On the other hand, in a case where the heating velocity exceeds 20° C./s, effects for preventing the progression of the cracks are maximized.

In the induction heating of the present embodiment, since the heating is performed at a heating velocity of 3° C./s to 20° C./s, at least a surface of a position C (refer to FIG. 2B), which is positioned on the welding center 12 of the bottom surface of the base portion 14 and on the center position 18 of the rail steel 10 in the width direction, is heated to a temperature which is higher than 600° C. to 800° C.

Preferably, the lower limit of the heating temperature is 640° C., and is more preferably 660° C. Preferably, the upper limit of the heating temperature is 780° C.

The upper limit of an initial temperature is not particularly limited if it is 600° C. or lower, is preferably 500° C. or lower, and is more preferably 400° C. or lower. The lower limit of the initial temperature is not particularly limited, and for example, may be room temperature (for example, 10° C. to 30° C.).

The surface temperature can be measured by a radiation-type thermometer. The heating velocity is a value (average value) which is obtained by dividing an increased temperature from the initial temperature (° C.) to the heating temperature which is higher than 600° C. to 800° C. by a heating time (second).

In addition, in the induction heating of the present embodiment, even in the case where the bottom surface of the base portion 14 is heated as described above, a head portion is not heated to higher than 600° C.

In the rail steel 10 of the Ac1 point or lower, basically, two phases of ferrite and cementite exist in the equilibrium diagram. By performing heat treatment higher than 600° C. on the rail steel 10 of the Ac1 point or lower, it is possible to soften the structures of the rail steel 10 due to spheroidizing of cementite, an increase in a ferrite grain size, tempering effects in a case where bainite or martensite exists, or the like. Since the structures of the rail steel 10 are softened, it is possible to prevent occurrence of cracks, and it is possible to prevent progression of the cracks even in a case where the cracks occur.

In addition, in a case where heat treatment higher than 800° C. is performed on the rail steel 10, cementite is disappeared from the structures of the rail steel 10, and it is not possible to obtain the effects for decreasing hardness due to the heat treatment.

Preferably, the heating time of the induction heating in the present embodiment is 10 seconds or longer and 265 seconds or shorter.

In the induction heating of the present embodiment, due to the shape of the coil 21, compared to the center position 18 in the width direction of the rail steel 10, the end portion in the width direction of the rail steel 10 is easily heated to a high temperature. However, since the length $L_2$ in the longitudinal direction of the outer region 22 of the coil 21 is 1.1 times or more W, it is possible to decrease a difference of temperature increase between the end portion in the width direction of the rail steel 10 and the center position 18 in the width direction when the induction heating is performed. Specifically, when the temperature of the center position 18 in the width direction of the rail steel 10 is heated to 600° C. by induction heating, the heating temperature of the end portion in the width direction of the rail can be limited to a temperature which is higher than 600° C. to 800° C.

Preferred conditions of the cooling step when the heating temperature is higher than 600° C. and Ac1 point or lower are different from preferred conditions of the cooling step when the heating temperature is higher than Ac1 point and 800° C. or less. This will be described in detail below.

Compared to the case where the length $L_2$ in the longitudinal direction is 1.1 times the width W, in a case where the length $L_2$ in the longitudinal direction of the outer region 22 of the coil 21 is 1.2 times or more the width W, it is possible to more effectively decrease the difference of temperature increase between the end portion in the width direction of the rail steel 10 and the center position 18 in the width direction. Specifically, when the center position 18 in the width direction of the rail steel 10 is heated to 600° C. by induction heating, the heating temperature of the end portion in the width direction of the rail can be also limited to be higher than 600° C. and the Ac1 point or lower. When the heating temperature is higher than 600° C. and the Ac1 point or less, as described below, it is possible to cool the rail steel 10 by an arbitrary method.

For example, as frequency when induction heating is performed, the frequency is preferably 1 kHz to 100 kHz, and is more preferably 2 kHz to 50 kHz. Since the frequency is high when the induction heating is performed, it is possible to easily control the heating in the present embodiment.

The holding time after heating (a holding time in a state where the surface temperature is maintained after heating) may be set, the holding time is preferably 20 seconds or shorter, and is more preferably 10 seconds or shorter. If the holding time increases, since the inner portion of the rail steel 10 is also heated and softened, the strength of the base portion 14 decreases. The holding time is a time in a state where heating is performed under predetermined conditions of heat input, and the amount of input heat is not zero while the amount of input heat is further reduced than that at the time of heating. Accordingly, in the holding time, the surface temperature may be lower than the heating temperature. In addition, the cooling after heating means a state where the amount of input heat is zero.

When heating is performed, the upper surface of the base portion 14 or the web portion 15 may be heated in addition to the bottom surface of the base portion 14. However, the head portion 13 is not in the heated regions. By performing heat treatment on both the base portion 14 and the head portion 13, a softening layer is formed on not only the base portion 14 but also the head portion 13. Due to wear when a wheel passes through the rail, the softening layer of the head portion 13 becomes an uneven wear dimple portion. The uneven wear generates downward displacement (elastic deformation) of the weld 11 when the wheel passes through the rail, and promotes the occurrence of cracks on the bottom surface of the base portion 14. Accordingly, by not heating the head portion 13, it is possible to prevent the occurrence of the cracks on the bottom surface of the base portion 14.

In addition, heating regions except for the head portion 13, that is, the head portion 13 being not heated means that the head portion 13 is positively or directly not heated (not softened), and the heating temperature of the head portion 13 does not exceed 600° C. (preferably, 400° C.) in the step of the heat treatment.

Step (B)

In the heat treatment method of the present embodiment, the cooling step is performed after the heating step is performed. As described above, the preferred cooling step in the case where the heating temperature is higher than 600° C. and Ac1 point or lower is different from the preferred cooling step in the case where the heating temperature is higher than Ac1 point and 800° C. or less.

(B-1) In Case where Heating Temperature is Higher than 600° C. and Ac1 Point or Lower In the case where the heating temperature is higher than 600° C. and Ac1 point or lower, it is possible to perform the cooling by an arbitrary cooling method and at an arbitrary cooling velocity. That is, air cooling (natural cooling: for example, the cooling velocity is 1° C./s or slower) may be performed, and accelerated cooling (forced cooling: for example, the cooling velocity is faster than 1° C./s to 20° C./s) may be performed. By using any cooling method, it is possible to generate sufficient softened structures on the bottom surface of the base portion 14 or the like.

The accelerated cooling method is not particularly limited, and can be performed by injecting water, air, or the like.

(B-2) In Case where Heating Temperature is Higher than Ac1 Point and 800° C. or Lower In the case where the heating temperature is higher than the Ac1 point and 800° C. or lower, the cooling is preferably performed by air cooling. In the case where the heating temperature is higher than Ac1 point, a γ-phase is generated in the structures. However, by heating the rail steel at the heating velocity of 3° C./s to 20° C./s, cementite is spheroidized. In addition, since the cooling is performed by air cooling, the spheroidized cementite remains in the structures. Accordingly, it is possible to more appropriately perform a softening treatment.

In the case where the heating temperature is higher than the Ac1 point and 800° C. or lower, when the accelerated cooling (forced cooling which is performed at the cooling velocity exceeding the cooling velocity of the air cooling) is performed after the heating, since minute pearlite structures or minute martensite structures are easily generated in the structures on the surface layer of the rail steel 10, softened structures are not easily generated.

(Rail Steel)

In a rail steel according to a third embodiment of the present invention, in the rail steel 10 having the weld 11, the heat treatment method according to the second embodiment is performed on the weld 11.

In the rail steel 10 subjected to the heat treatment, the hardness of the head portion 13 in the weld 11 is not substantially changed from the hardness of the head portion 13 before the heat treatment is performed. However, the hardness of at least the bottom surface of the base portion 14 in the weld 11 decreases. That is, the hardness of the head portion 13 of the weld 11 is higher than the hardness of the bottom surface of the base portion 14 of the weld 11.

In the rail steel 10 of the present embodiment, the welding center 12, on which crack fractures are most easily generated on at least the bottom surface of the base portion 14 except for the head portion, is subjected to the softening treatment, and the region outside the HAZ 17, in which the crack fractures are easily generated secondarily next to the welding center 12 and the hardness changes rapidly, is subjected to the softening treatment. In addition, in the rail steel 10 of the present embodiment, the head portion 13 is not subjected to the softening treatment. Accordingly, in the rail steel 10 of the present embodiment, occurrence of brittle fractures which originate in the base portion 14 in the weld 11 is prevented.

The present invention is not limited to the above-described embodiments, and configurations thereof may be modified within the scope which does not depart from the gist of the present invention. For example, the number of the windings of the coil 21 is not limited to one, and may be two or more. In addition, the shape of the coil 21 when the coil 21 is viewed from the direction of the axis 23 is not limited to the rectangular shape, and for example, may be an elliptical shape or the like.

EXAMPLE

Hereinafter, according to Examples and Comparative Examples, the contents of the present invention will be more specifically described. In addition, the present invention is not limited to the following Examples. Moreover, measurement conditions or the like are as follows.

Temperature Measurement Position of Base Portion: the center (welding center) in the length direction of the rail and the center in the width direction of the rail on the bottom surface of the base portion of the HAZ Temperature Measurement Position of Head Portion: the center (welding center) in the length direction of the rail and the center in the width direction of the rail on the apex of the head portion of the HAZ Heating Velocity: an average heating velocity (° C./s) from the initial temperature to the heating temperature Temperature Measurement Method: measured by a radiation-type thermometer Heating method: induction heating (frequency of 10 kHz) using a coil which is wound once in an approximately rectangular shape. The coil was heated so as to be close to the heating region such that the plane of the coil and the heating region were approximately parallel with each other and the coil was symmetrical based on the welding center and the center position in the width direction of the rail. The outer region of the coil was set to the heating region.

Ac1 Point of Rail Steel: 725° C.

Lh: 40 mm

Example 1

A weld of a rail steel was subjected to heat treatment under the following conditions.
Heating Region: bottom surface of base portion (Example) or both bottom surface of base portion and head portion (Comparative Example)
Initial Temperature: 400° C.
Heating Temperature: 650° C.
Heating Velocity: 5° C./s
Holding After Heating: not Performed
Cooling Velocity After Heating: 5° C./s (accelerated cooling)
Length $L_1$ in Lateral Direction of Outer Region of Coil: 1.2 times Lh
Length $L_2$ in Longitudinal Direction of Outer Region of Coil: 1.4 times W (($L_2$−W)/2=0.2 times W)

In addition, in Example, in a case where only the bottom surface of the base portion was heated, it was confirmed that the surface temperature of the head portion did not exceed 400° C.

<Evaluation 1>

Figure 3A:
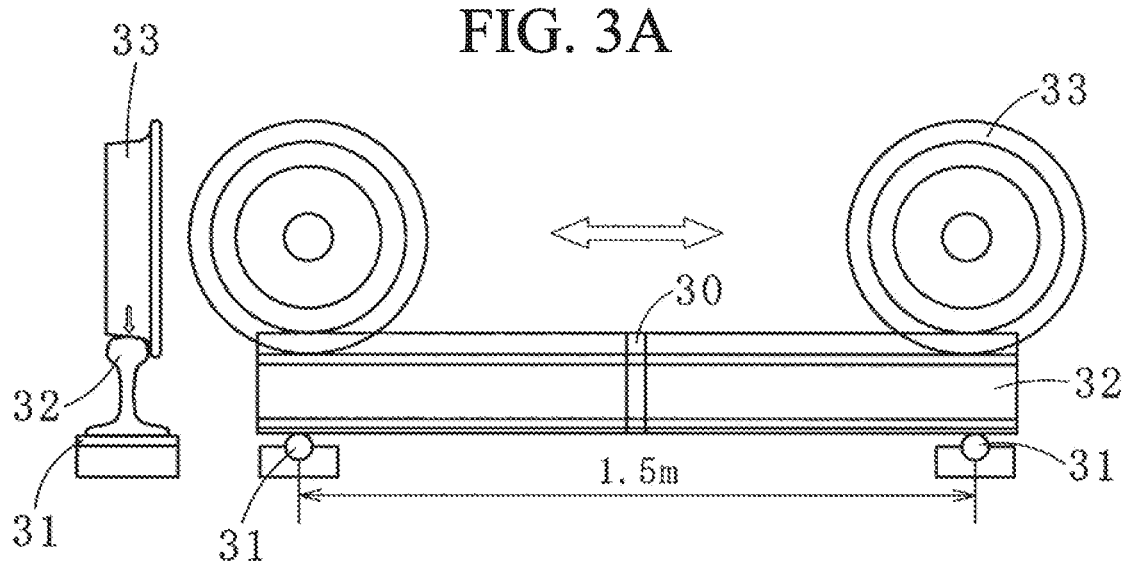
FIG. 3A is an explanatory view showing a measurement method of an evaluation test in Example 1.

Evaluations with respect to each of the rail steels which was subjected to the heat treatment in Example 1 and a test material (AW) after the welding which was not subjected to the heat treatment in Example 1 were performed by the following method. As shown in FIG. 3A, a pair of cylindrical steels 31 was positioned at positions separated from each other by 1.5 m with the weld 30 as the center, and supported a rail steel 32. Within the range of 1.5 m, a load was applied to the rail steel 32 by reciprocation of a loaded wheel 33, and frequency of reciprocation and an abrasion amount of the head portion were measured until the rail steel 30 was broken. The measurement results are shown in FIG. 3B.

Figure 3B:
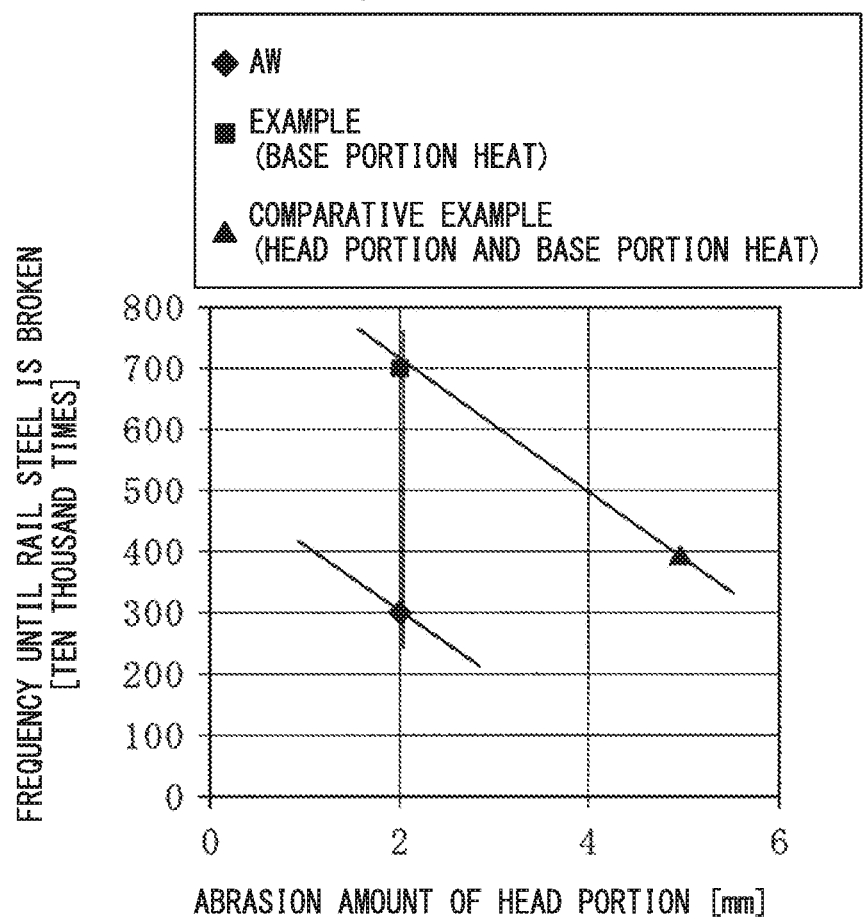
FIG. 3B is a graph showing results of the evaluation test in Example 1.

As shown in FIG. 3B, in Example in which only the base portion was heated, the frequency of reciprocation until the rail steel 30 was broken remarkably increased, and it was understood that the weld had high tolerance with respect to brittle fractures. Meanwhile, in Comparative Example in which the base portion and the head portion were heated, the abrasion amount of the head portion increased, and it was understood that tolerance with respect to the brittle fractures was not improved.

Example 2

A weld of a rail steel was subjected to heat treatment under the following conditions.
Heating Region: bottom surface of base portion
Initial Temperature: 400° C.
Heating Temperature: 650° C.
Heating Velocity: changed within range of 0.2° C./s to 25° C./s
Holding After Heating: not Performed
Cooling Velocity After Heating: 5° C./s (accelerated cooling)
Length $L_1$ in Lateral Direction of Outer Region of Coil: 1.2 times Lh
Length $L_2$ in Longitudinal Direction of Outer Region of Coil: 1.4 times W (($L_2$−W)/2=0.2 times W)

<Evaluation 2>

Figure 4A:
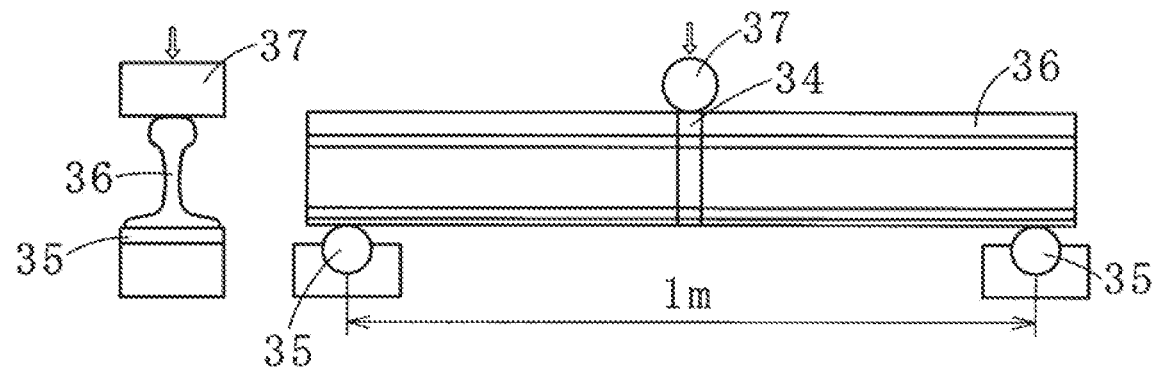
FIG. 4A is an explanatory view showing a measurement method of a bending test in Example 2.

Evaluations with respect to each of the rail steels subjected to heat treatment in Example 2 were performed by the following method. As shown in FIG. 4A, a pair of cylindrical steels 35 having a radius of 50 mm was positioned at positions separated from each other by 1 m with a weld 34 as the center, and supported a rail steel 36. The weld 34 was pressed by a cylindrical steel 37 having a radius of 50 mm from the above. The loading rate of the pressurization (load) was set to 10 mm/min. The load (fracture load) and a deflection amount (fracture deflection amount) when the rail steel 36 was broken were shown in FIG. 4B.

Figure 4B:
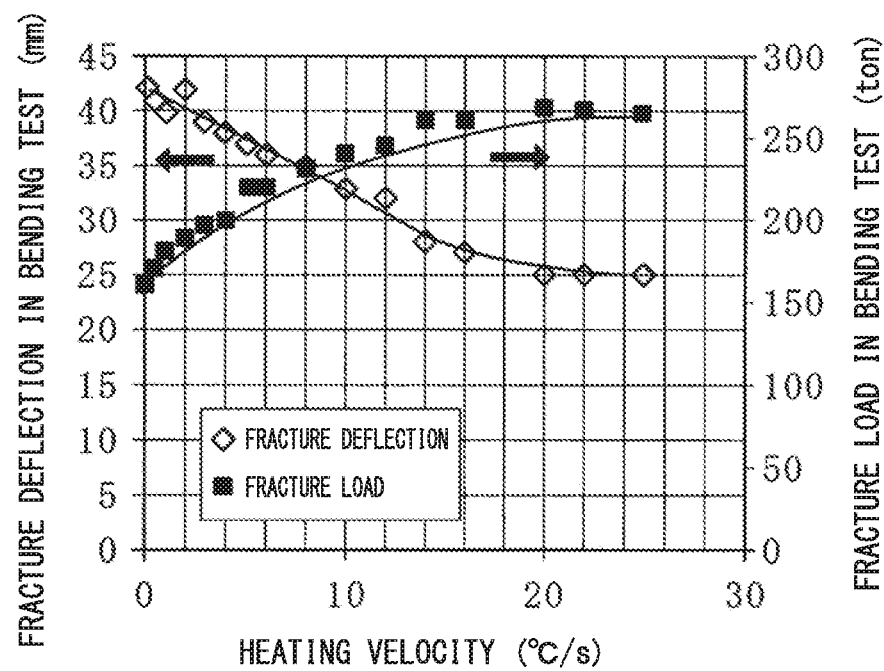
FIG. 4B is a graph showing measurement results of the bending test in Example 2.

As shown in FIG. 4B, the fracture load increases as the heating velocity increases, and tolerance with respect to brittle fractures is likely to increase.

In a case where the heating velocity is slower than 3° C./s, the fracture deflection excessively increases, and the fracture load decreases. It is considered that this is because not only the surface layer of the base portion but also the deep portion is softened, and thus, the strength decreases.

Meanwhile, in a case where the heating velocity exceeds 20° C./s, a softening layer having a predetermined thickness is not formed, and tolerance with brittle fractions is saturated.

Example 3

A weld of a rail steel was subjected to heat treatment under the following conditions.
Heating Region: bottom surface of base portion
Initial Temperature: 400° C.
Heating Temperature: changed within range of 420° C. to 1000° C.
Heating Velocity: 5° C./s
Holding After Heating: not Performed
Cooling Velocity After Heating: performed at each of 5° C./s (accelerated cooling) and 0.9° C./s (air cooling)

Length $L_1$ in Lateral Direction of Outer Region of Coil: 1.2 times Lh

Length $L_2$ in Longitudinal Direction of Outer Region of Coil: 1.4 times W (($L_2$-W)/2=0.2 times W)

<Evaluation 3>

Hardness (Hv98N) at a point of 5 mm depth which was the temperature measurement position of the bottom surface of the base portion was measured on the rail steel which was subjected to heat treatment under each condition of Example 3. The measurement results are shown in FIG. 5.

Figure 5:
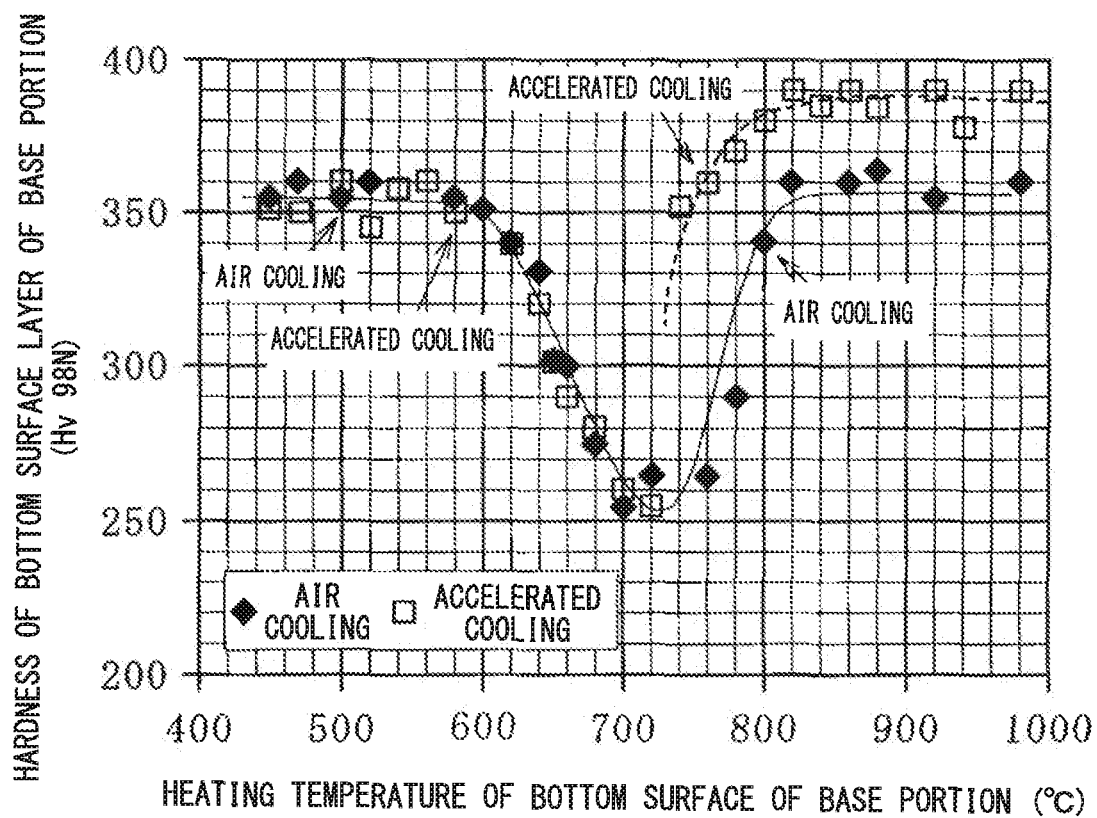
FIG. 5 is a graph showing results of an evaluation test in Example 3.

As shown in FIG. 5, in a case where the heating temperature is higher than 600° C. and 725° C. (Ac1 point) or lower, even if cooling is performed by any of the air cooling and the accelerated cooling, it is understood that the hardness at the measurement position sufficiently decreases.

In a case where the heating temperature is higher than 725° C. (Ac1 point) and 800° C. or lower, if the cooling is performed by the air cooling after the heating, the hardness at the measurement position sufficiently decreases. Meanwhile, in a case where the heating temperature is higher than 725° C. (Ac1 point) to 800° C., if the cooling is performed by the accelerated cooling after the heating, the hardness at the measurement position does not sufficiently decrease.

In addition, as shown in the following Example 4, even in a case where the accelerated cooling is performed after the heating is performed to be higher than 725° C. to 800° C., tolerance with respect to brittle fractures is improved.

Example 4

A weld of a rail steel was subjected to heat treatment under the following conditions.

Heating Region: bottom surface of base portion (Example) or both bottom surface of base portion and head portion (Comparative Example)
Initial Temperature: 400° C.
Heating Temperature: 750° C.
Heating Velocity: 5° C./s
Holding After Heating: not Performed
Cooling Velocity After Heating: performed at each of 5° C./s (accelerated cooling) and 0.9° C./s (air cooling)
Length $L_1$ in Lateral Direction of Outer Region of Coil: 1.2 times Lh
Length $L_2$ in Longitudinal Direction of Outer Region of Coil: 1.4 times W (($L_2$-W)/2=0.2 times W)

<Evaluation 4>

Evaluations with respect to each rail steel which was subjected to the heat treatment in Example 4 and a test material (AW) after the welding which was not subjected to the heat treatment in Example 4 were performed by method similar to that of Evaluation 1. The measurement results are shown in FIG. 6.

Figure 6:
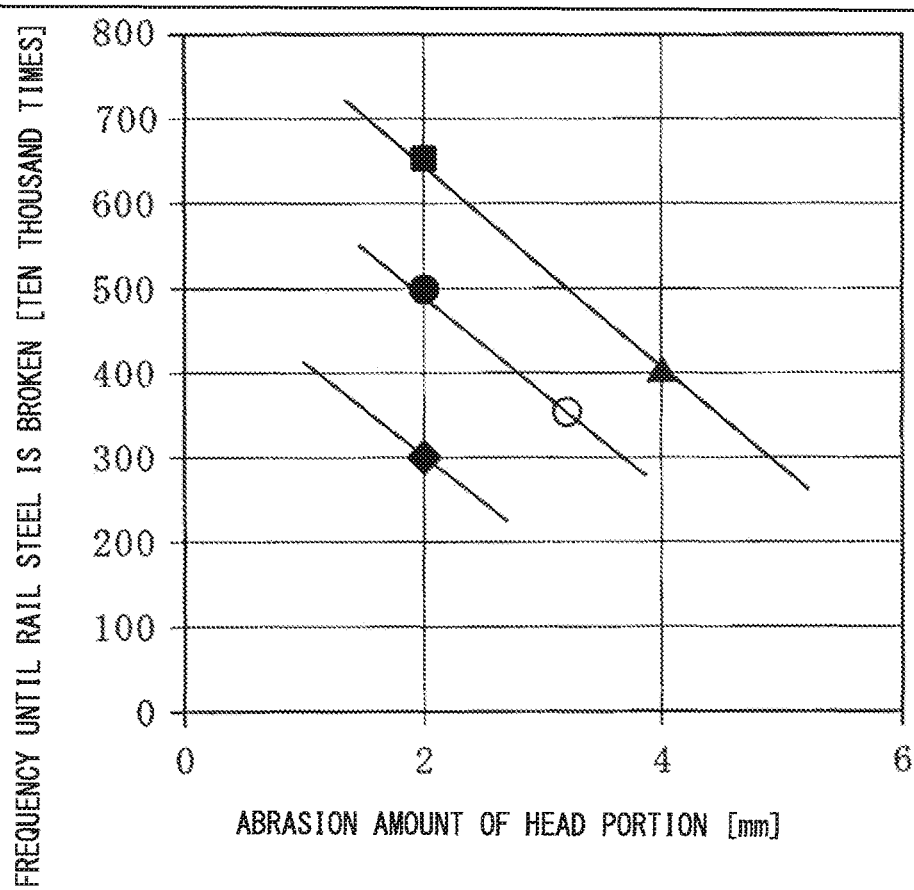
FIG. 6 is a graph showing results of an evaluation test in Example 4.

As shown in FIG. 6, in Example in which only the base portion was heated to 750° C., even in a case where the cooling was performed by any of the accelerated cooling and the air cooling after the heating, compared to the AW, the frequency until the rail steel was broken largely increased. In addition, compared to a case where the cooling was performed by the accelerated cooling after the heating, in a case where the cooling was performed by the air cooling after the heating, the frequency until the rail steel was broken increased.

Example 5

A weld of a rail steel was subjected to heat treatment under the following conditions.

Heating Region: bottom surface of base portion
Initial Temperature: 400° C.
Heating Temperature: 750° C.
Heating Velocity: changed within range of 0.2° C./s to 25° C./s
Holding After Heating: not Performed
Cooling Velocity After Heating: performed at 0.9° C./s (air cooling)
Length $L_1$ in Lateral Direction of Outer Region of Coil: 1.2 times Lh
Length $L_2$ in Longitudinal Direction of Outer Region of Coil: 1.4 times W (($L_2$-W)/2=0.2 times W)

<Evaluation 5>

Evaluations with respect to each of the rail steels subjected to heat treatment in Example 5 were performed by the method similar to that of Evaluation 2. The evaluation results are shown in FIG. 7.

Figure 7:
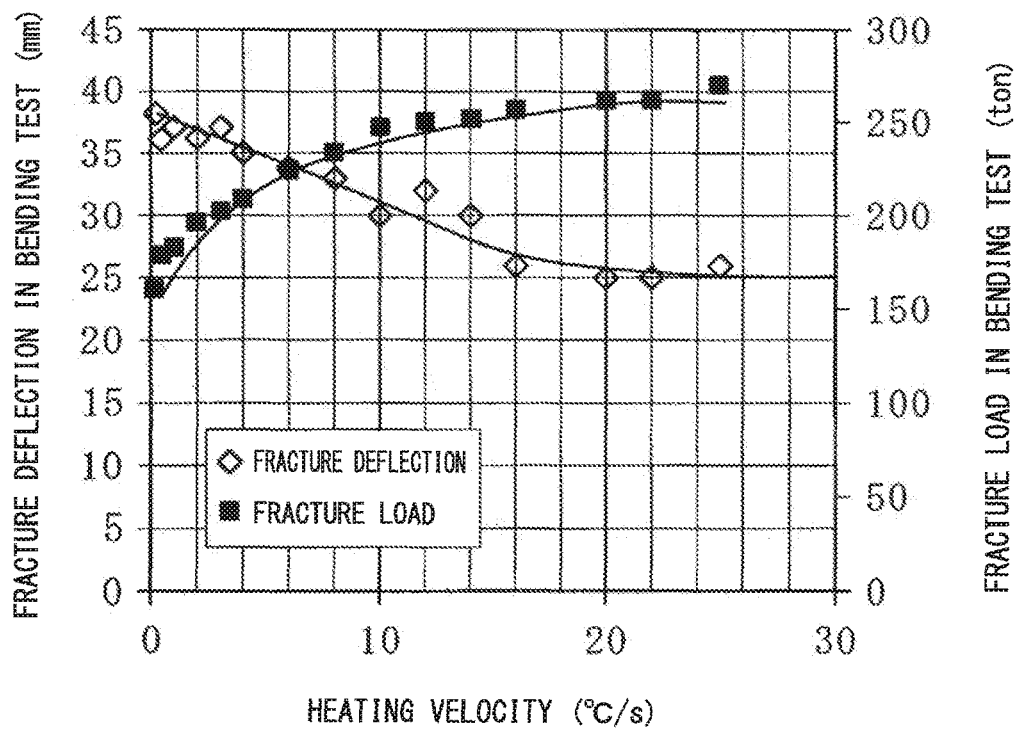
FIG. 7 is a graph showing results of an evaluation test in Example 5.

As shown in FIG. 7, the fracture load increases as the heating velocity increases, and tolerance with respect to brittle fractures is likely to increase. In a case where the heating velocity is slower than 3° C./s, the fracture deflection excessively increases, and the fracture load decreases. Compared in a case where the heating velocity is 20° C./s, in a case where the heating velocity exceeds 20° C./s, the fracture deflection and the fracture load do not change, and effects for preventing progression of cracks are maximized.

Example 6

A weld of a rail steel was subjected to heat treatment under the following conditions.

Heating Region: bottom surface of base portion
Initial Temperature: 400° C.
Heating Temperature: 650° C.
Heating Velocity: 5° C./s
Holding After Heating: not Performed
Cooling Velocity After Heating: performed at 5° C./s (accelerated cooling)
Length $L_1$ in Lateral Direction of Outer Region of Coil: 1.2 times Lh (Example) or 1.0 time Lh (Comparative Example)
Length $L_2$ in Longitudinal Direction of Outer Region of Coil: 1.4 times W (($L_2$-W)/2=0.2 times W)

<Evaluation 6>

The hardness (Hv 98N) at a point of 5 mm depth which was the temperature measurement position of the bottom surface of the base portion was measured on each rail steel which was subjected to the heat treatment in Example 6 and a test material (AW) after the welding which was not subjected to the heat treatment in Example 6. The measurement results are shown in FIG. 8.

Figure 8:
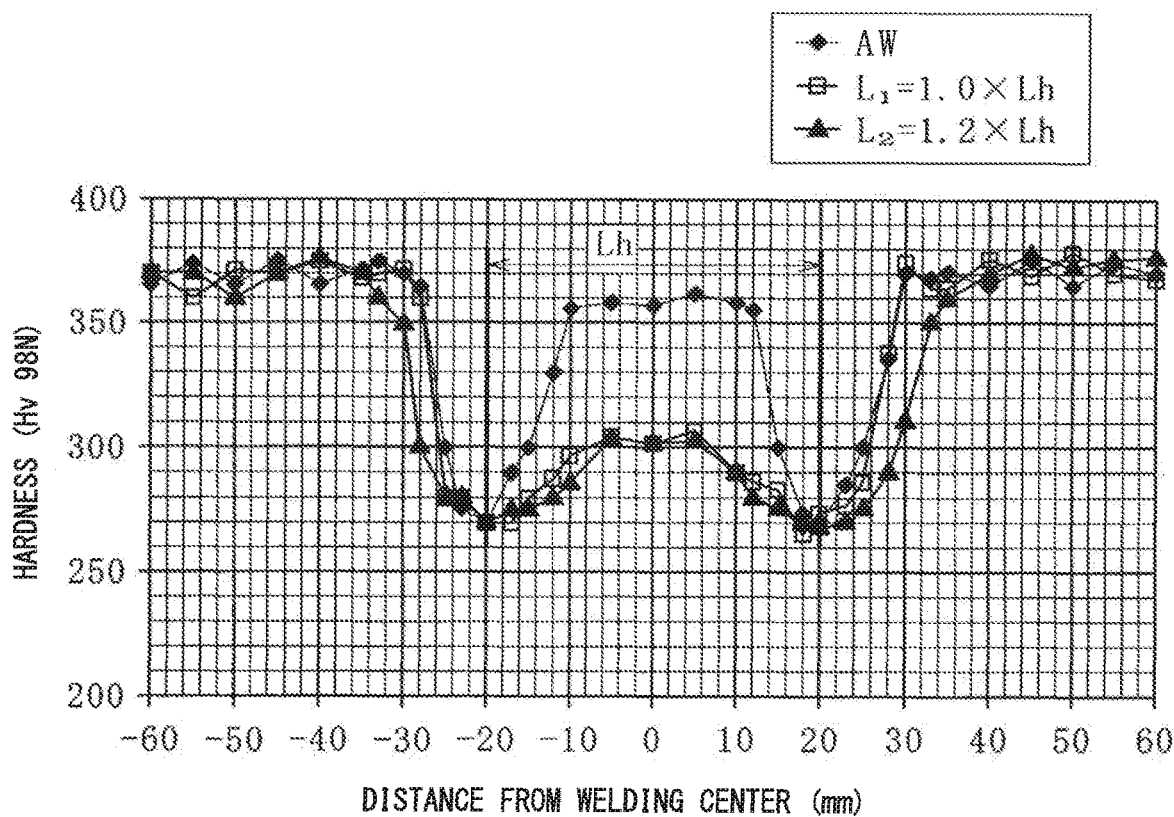
FIG. 8 is a graph showing results of an evaluation test in Example 6.

As shown in FIG. 8, in the AW, the hardest portion in the HAZ is positioned on the welding center. In addition, from the measurement results of the AW, it is understood that a portion in which the hardness changes rapidly exists at a position outside the HAZ (a position which is separated from the welding center by 25 mm to 30 mm and a position which is approximately 0.7 times Lh in a case where Lh is 40 mm).

In a case where heating is performed within the same range as that of the HAZ using a coil in which the length of $L_1$ is 1.0 time Lh, the welding center is softened. However, the hardness of the portion in which the hardness changes rapidly is hardly changed.

Meanwhile, in a case where heating is performed using a coil in which the length of $L_1$ is 1.2 times Lh, it is understood that the welding center is softened, and the change in the hardness of the portion in which the hardness changes rapidly is gentle.

Example 7

A weld of a rail steel was subjected to heat treatment under the following conditions.
Heating Region: bottom surface of base portion
Initial Temperature: 400° C.
Heating Temperature: 650° C.
Heating Velocity: 5° C./s
Holding After Heating: not Performed
Cooling Velocity After Heating: performed at 5° C./s (accelerated cooling)
Length $L_1$ in Lateral Direction of Outer Region of Coil: changed within a range from 0.8 times Lh to 3.0 times Lh. In addition, a case where $L_1$ is 1.2 times or more Lh is Example, and the other cases are Comparative Examples.
Length $L_2$ in Longitudinal Direction of Outer Region of Coil: 1.4 times W (($L_2$-W)/2=0.2 times W)
<Evaluation 7>
Evaluations with respect to each of the rail steels subjected to heat treatment in Example 7 were performed by the method similar to that of Evaluation 2. The measurement results are shown in FIG. 9.

Figure 9:
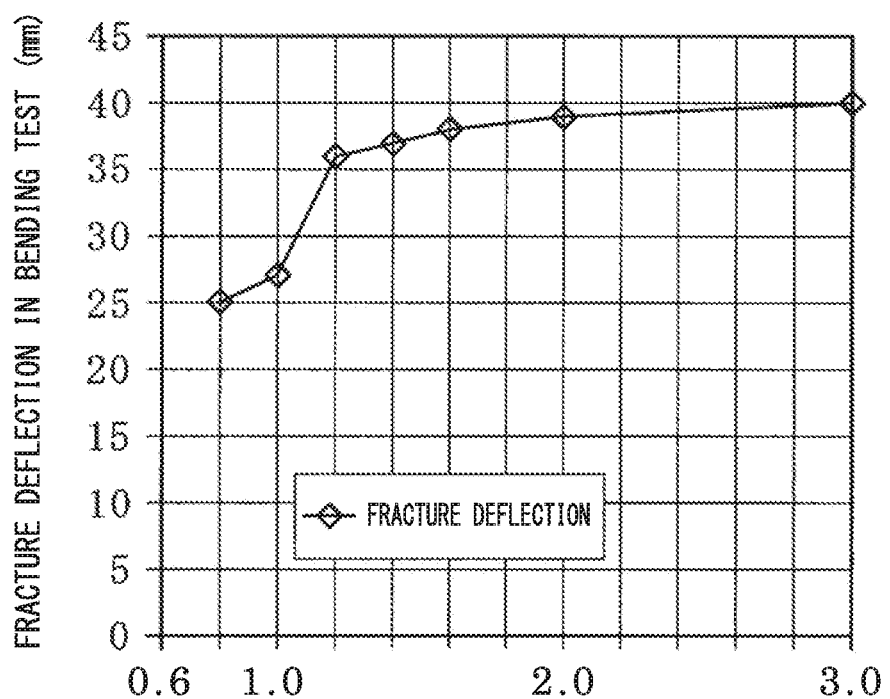
FIG. 9 is a graph showing results of an evaluation test in Example 7.

As shown in FIG. 9, by setting $L_1$ to be 1.2 times or more Lh, the fracture deflection remarkably increases, and tolerance with respect to brittle fractures increases. It is considered that this is an effect which is obtained from softening of the portion which is positioned outside the HAZ and in which the hardness changes rapidly.

Example 8

A weld of a rail steel was subjected to heat treatment under the following conditions.
Heating Region: bottom surface of base portion
Initial Temperature: 400° C.
Heating Temperature (of point positioned on welding center and at center in width direction of rail): 600° C.
Heating Velocity: 5° C./s
Holding After Heating: not Performed
Length $L_1$ in Lateral Direction of Outer Region of Coil: 1.2 times Lh
Length $L_2$ in Longitudinal Direction of Outer Region of Coil: performed at three kinds of 1.0 time W (($L_2$-W)/2=0, Comparative Example), 1.1 times W (($L_2$-W)/2=0.05 times W, Example), and 1.2 times W (($L_2$-W)/2=0.1 times W, Example)
<Evaluation 8>
Immediately after the heat treatment was performed in Example 8, that is, when the temperature of the point positioned on the welding center and at the center in the width direction of the rail was 600° C., the temperature of a position A and a temperature of a position B were measured along the length direction of the rail. Here, the position A is positioned at 5 mm inward from one end and the other end in the width direction of the rail, and the position B is the center in the width direction of the rail.

In addition, the temperature of the position which is positioned at 5 mm inward from the one end in the width direction of the rail was the same as the temperature of the position which is positioned at 5 mm inward from the other end.

Figure 10A:
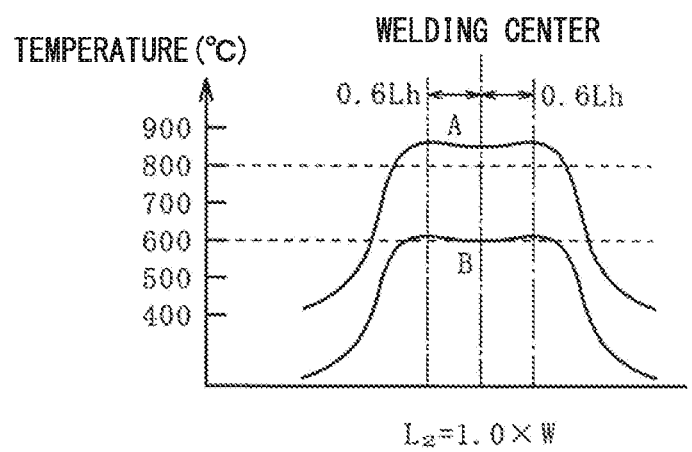
FIG. 10A is a graph showing results of a temperature measurement in a case where $L_2$ is 1.0 times W in Example 8.
Figure 10B:
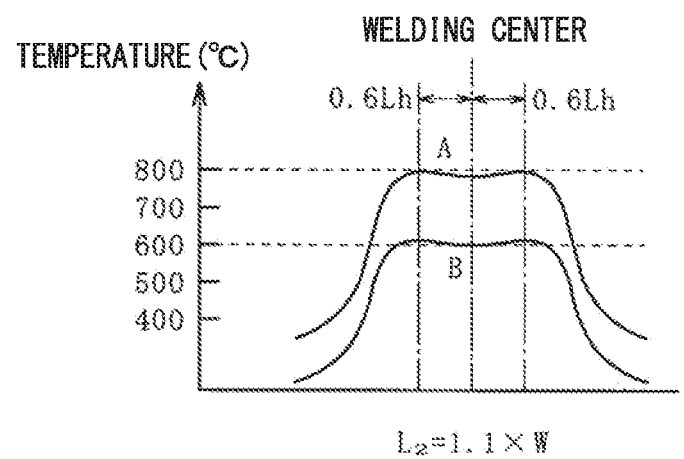
FIG. 10B is a graph showing results of a temperature measurement in a case where $L_2$ is 1.1 times W in Example 8.
Figure 10C:
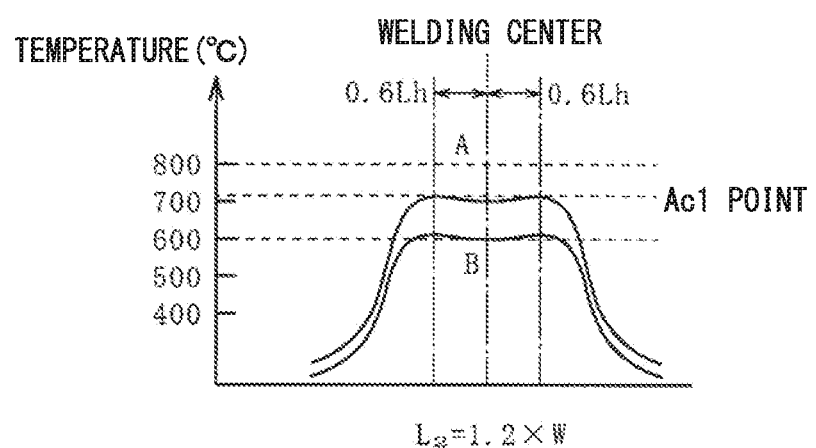
FIG. 10C is a graph showing results of a temperature measurement in a case where $L_2$ is 1.2 times W in Example 8.

The measurement results are shown in FIGS. 10A to 10C.

FIG. 10A shows the measurement results in a case where $L_2$ is 1.0 time W, FIG. 10B shows the measurement results in a case where $L_2$ is 1.1 times W, and FIG. 10C shows the measurement results in a case where $L_2$ is 1.2 times W.

As shown in FIG. 10A, in the case where $L_2$ is 1.0 time W, when the portion of the position B is heated to 600° C., the temperature of the position A exceeds 800° C. In this case, as shown in FIG. 5 or the like, the portion of the position A on the welding center is not sufficiently softened.

As shown in FIG. 10B, in the case where $L_2$ is 1.1 times W (($L_2$-W)/2=0.05 times W), when the portion of the position B is heated to 600° C., the temperature of the position A can be suppressed to 800° C. or lower. Accordingly, the portion of the position A can be softened. However, since the temperature of the position A exceeds the Ac1 point (725° C.), in order to soften the portion of the position A, it is necessary to perform the cooling by air cooling after the heating.

As shown in FIG. 10C, in the case where $L_2$ is 1.2 times W (($L_2$-W)/2=0.1 times W), when the portion of the position B is heated to 600° C., the temperature of the position A can be suppressed to the Ac1 point (725° C.) or lower. Accordingly, even when the cooling is performed by any of the air cooling and the accelerated cooling after the heating, it is possible to perform the softening.

INDUSTRIAL APPLICABILITY

According to each embodiment, it is possible to provide the heat treatment device, the heat treatment method, and the rail steel which are suitable for preventing the occurrence of brittle fractures which originate in a base portion of the weld of the rail steel.

BRIEF DESCRIPTION OF THE REFERENCE SYMBOLS

10: Rail Steel (Rail)
11: Weld
12: Welding Center
13: Head Portion
14: Base Portion
15: Web Portion
16: Region Interposed between a Pair of Virtual Lines
17: HAZ
18: Center Position in Width Direction of Rail
20: Heat Treatment Device
21: Coil
22: Outer Region
23: Axis
24: Virtual Line
30: Weld
31: Cylindrical Steel
32: Rail Steel
33: Wheel
34: Weld
35: Cylindrical Steel
36: Rail Steel
37: Cylindrical Steel
C: Position which is Positioned on Welding Center of Bottom Surface of Base Portion and on Center Position of Rail Steel in Width Direction

The invention claimed is:
1. A heat treatment device which includes a coil and heats a bottom surface of a base portion of a weld of a rail steel by induction heating, wherein the coil is disposed so as to face the bottom surface of the base portion of the weld, and wherein when a region in the weld which is heated to an Ac1 point or higher during welding is represented by HAZ, and a length of the HAZ in a length direction of the rail on the bottom surface of the base portion is represented by Lh, and a width of the rail steel is represented by W, when viewed in a line of sight against the bottom surface of the base portion, a length of an outer region of the coil in the length direction of the rail is 1.2 times or more Lh and a length of the outer region of the coil in a width direction of the rail is 1.1 times or more W.

2. The heat treatment device according to claim 1, wherein the length of the outer region of the coil in the length direction of the rail is 40 mm or more.

3. The heat treatment device according to claim 1, wherein the length of the outer region of the coil in the width direction of the rail is 1.2 times or more W.

4. The heat treatment device according to claim 1, wherein a shape of the outer region of the coil is rectangular.

5. A heat treatment method of a weld of a rail steel, the method comprising:
 disposing the coil of the heat treatment device according to claim 1 so as to face the bottom surface of the base portion and heating a region which is interposed between a pair of virtual lines, which are positioned symmetrically with respect to a welding center when viewed in a line of sight against the bottom surface of the base portion such that a distance between the pair of virtual lines is 1.2 times Lh, at a heating velocity of 3° C./s to 20° C./s, so that at least a position C, which is positioned on the welding center of the bottom surface of the base portion and on the center of the rail steel in the width direction, is heated to higher than 600° C. to 800° C.; and
 cooling the rail steel after the heating.

6. The heat treatment method of a weld of a rail steel according to claim 5, wherein in the heating, the position C is heated to a temperature which is higher than 600° C. and the Ac1 point or lower.

7. The heat treatment method of a weld of a rail steel according to claim 5, wherein in the heating, the position C is heated to a temperature which is higher than the Ac1 point and 800° C. or lower, and the cooling is performed by natural cooling.

8. The heat treatment method of a weld of a rail steel according to claim 5, wherein in the heating, a heating temperature of a head portion of the rail steel is set to 600° C. or lower.

9. The heat treatment device according to claim 2, wherein the length of the outer region of the coil in the width direction of the rail is 1.2 times or more W.

10. The heat treatment device according to claim 2, wherein a shape of the outer region of the coil is rectangular.

11. The heat treatment device according to claim 3, wherein a shape of the outer region of the coil is rectangular.

12. A heat treatment method of a weld of a rail steel, the method comprising:
 disposing the coil of the heat treatment device according to claim 2 so as to face the bottom surface of the base portion and heating a region which is interposed between a pair of virtual lines, which are positioned symmetrically with respect to a welding center when viewed in a line of sight against the bottom surface of the base portion such that a distance between the pair of virtual lines is 1.2 times Lh, at a heating velocity of 3° C./s to 20° C./s, so that at least a position C, which is positioned on the welding center of the bottom surface of the base portion and on the center of the rail steel in the width direction, is heated to higher than 600° C. to 800° C.; and
 cooling the rail steel after the heating.

13. A heat treatment method of a weld of a rail steel, the method comprising:
 disposing the coil of the heat treatment device according to claim 3 so as to face the bottom surface of the base portion and heating a region which is interposed between a pair of virtual lines, which are positioned symmetrically with respect to a welding center when viewed in a line of sight against the bottom surface of the base portion such that a distance between the pair of virtual lines is 1.2 times Lh, at a heating velocity of 3° C./s to 20° C./s, so that at least a position C, which is positioned on the welding center of the bottom surface of the base portion and on the center of the rail steel in the width direction, is heated to higher than 600° C. to 800° C.; and
 cooling the rail steel after the heating.

14. A heat treatment method of a weld of a rail steel, the method comprising:
 disposing the coil of the heat treatment device according to claim 4 so as to face the bottom surface of the base portion and heating a region which is interposed between a pair of virtual lines, which are positioned symmetrically with respect to a welding center when viewed in a line of sight against the bottom surface of the base portion such that a distance between the pair of virtual lines is 1.2 times Lh, at a heating velocity of 3° C./s to 20° C./s, so that at least a position C, which is positioned on the welding center of the bottom surface of the base portion and on the center of the rail steel in the width direction, is heated to higher than 600° C. to 800° C.; and
 cooling the rail steel after the heating.

15. The heat treatment method of a weld of a rail steel according to claim 6, wherein in the heating, a heating temperature of a head portion of the rail steel is set to 600° C. or lower.

16. The heat treatment method of a weld of a rail steel according to claim 7, wherein in the heating, a heating temperature of a head portion of the rail steel is set to 600° C. or lower.

* * * * *